E. B. VIETS.
STEAMING AND DRYING APPARATUS FOR SHAPING PANTALOONS.
No. 7,603. Reissued April 10, 1877.
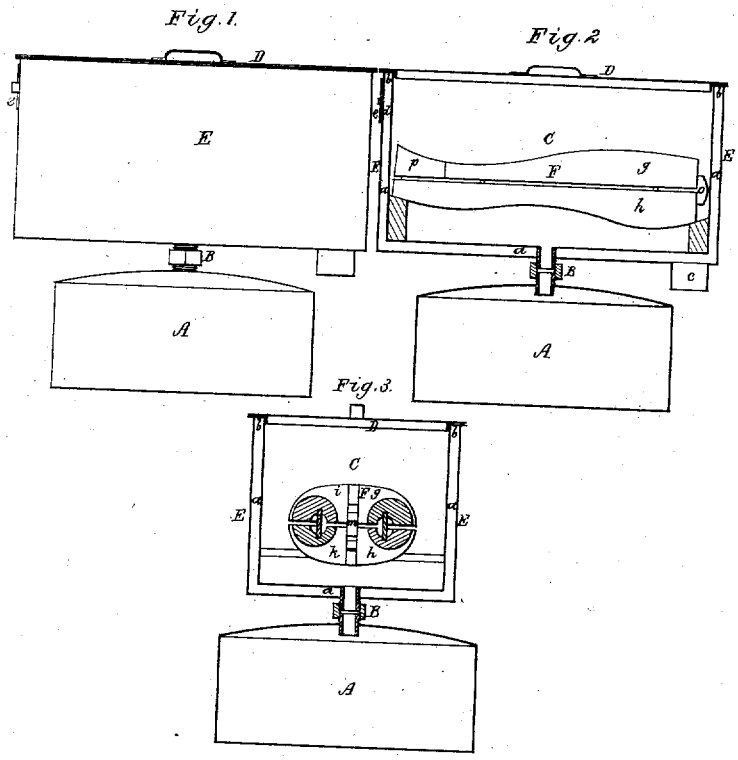
Witnesses
S. W. Piper
L. H. Hollard
Ellen B. Viets
by her attorney
R. H. Eddy
N. PETERS, PHOTO-LITHOGRAPHER, WASHINGTON, D. C.

UNITED STATES PATENT OFFICE.

ELLEN B. VIETS, OF BOSTON, MASSACHUSETTS.

IMPROVEMENT IN STEAMING AND DRYING APPARATUS FOR SHAPING PANTALOONS.

Specification forming part of Letters Patent No. 144,644, dated November 18, 1873; reissue No. 7,603, dated April 10, 1877; application filed May 22, 1875.

*To all whom it may concern:*

Be it known that I, ELLEN B. VIETS, of Boston, of the county of Suffolk and State of Massachusetts, have made a new and useful invention for Shaping Pantaloons or Trousers; and do hereby declare the same to be fully described in the following specification, reference being had to the accompanying drawings, of which—

Figure 1 is a side elevation, Fig. 2 a longitudinal section, and Fig. 3 a transverse section, of my apparatus for effecting the shaping of pantaloons or trousers.

My invention consists in an apparatus for, and a mode or process of, shaping garments termed "pantaloons" or "trousers."

In such drawings, A represents a steam generator or boiler, over which, and connected to it by a screw-coupling, B, is a steaming-chamber, C. This chamber is open at top, and there provided with a removable cover, D. Furthermore, the chamber on its sides, ends, and bottom is inclosed within another or drying chamber or case, E, so that there may be a space, *a*, between the two, and extending under the bottom and against the sides and ends of the chamber C, such space being covered at top, as shown at *b*.

There is an opening or induct, *c*, leading out of the bottom of the space *a*, near one end of the chamber E, and there is also an eduction-opening, *d*, in the opposite end of the chamber or case E, such opening being provided with a damper, *e*.

Within the steaming-chamber is the pantaloon-former F, which may rest on the bottom of the chamber, or on suitable supports placed thereon.

The shape of the former may be varied, as the pantaloons, drawers, or garment to be shaped may need or require.

After the former may have been introduced within a pair of trousers, and the wedges driven so as to cause it to fit closely to them, and stretch them to the desired extent, the whole is to be placed within the steaming-chamber, after which the cover of the latter is to be put in place over the said chamber, and steam from the steam-generator is to be allowed or caused to flow into the said chamber.

After the trousers may have been sufficiently steamed, the steam is to be arrested from further ingress into the steaming-chamber, after which hot air or the heated volatile products of combustion of fuel or a lamp or burner are to be introduced into and suffered to flow through the heating chamber or space *a*, in order to heat the air within the steaming-chamber, so as to desiccate the trousers.

On removing them from the former, it will be found that they will be shaped as they usually are by the process of ironing or pressing, and all danger of burning or scorching them will be avoided.

Thus it will be seen that my process of shaping pantaloons has material advantages over the common method of doing so by a hot pressing-iron and a mold or leg-shaping apparatus, as usually employed by tailors and pressers.

I claim as my invention as follows, viz:

1. For shaping pantaloons or trousers, the mode or process substantially as described, consisting in first stretching the garment on and by means of an expansible former, and next introducing such former, and the garment stretched thereon, into a box or chamber, and, while therein, subjecting both garment and former to the action of steam let into such chamber or box, and subsequently rapidly desiccating the garment, while on the former, by heat applied thereto, as described, all being substantially as set forth.

2. The combination of a former, F, constructed substantially as described, and the steaming and drying chambers C E, substantially as and for the purpose set forth.

3. The combination of the former F, the steaming and drying chambers C E, and the steam-generator A, all being arranged and applied together substantially in manner and for the purpose as specified.

ELLEN B. VIETS.

Witnesses:

R. H. EDDY,

J. R. SNOW.